No. 613,031. Patented Oct. 25, 1898.
B. F. GILBERT & G. G. JAMES.
BUDDING TOOL.
(Application filed Sept. 23, 1897.)
(No Model.)
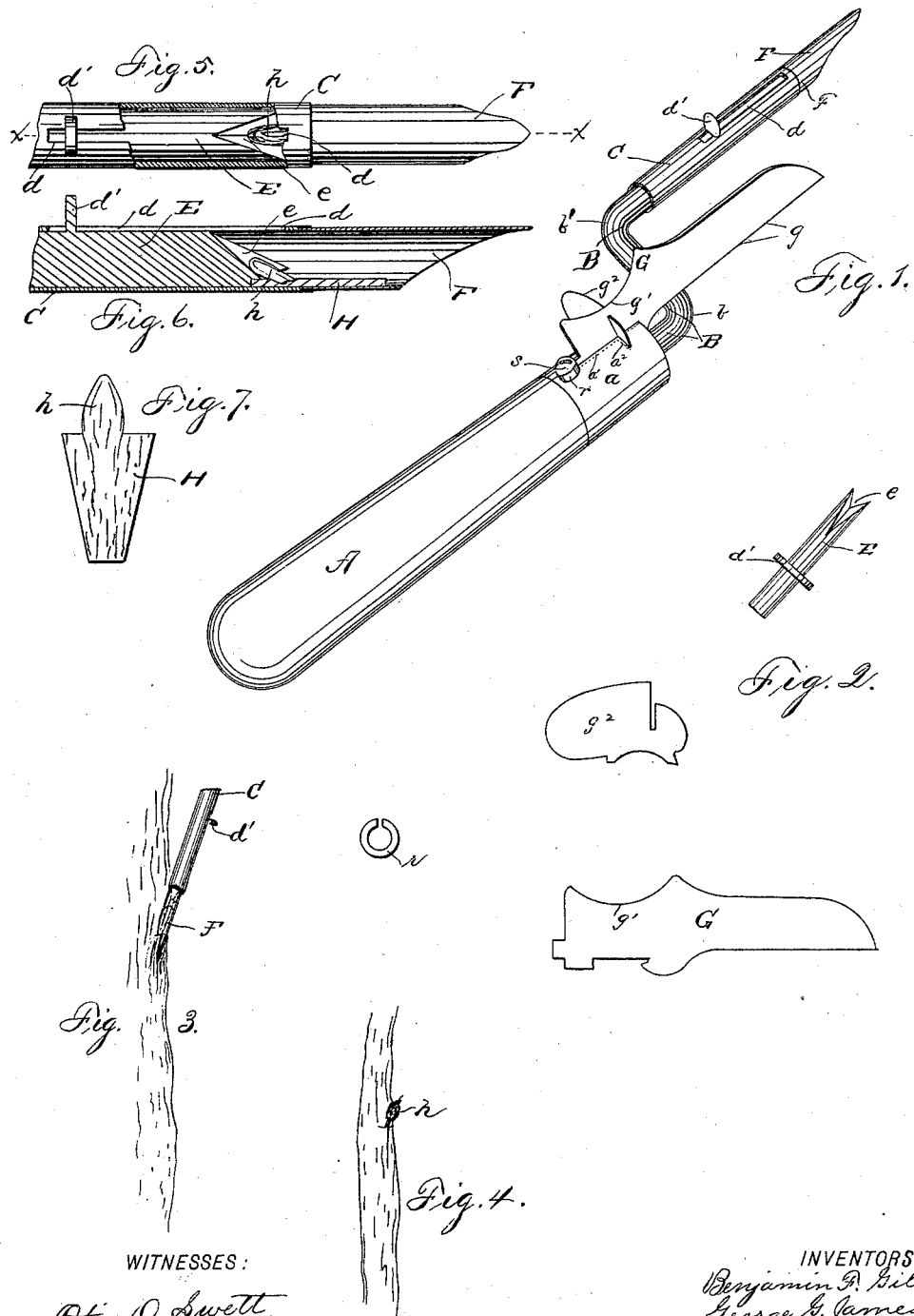
WITNESSES:
Otis D. Swett.
C. H. Childs.
INVENTORS
Benjamin F. Gilbert,
George G. James.
BY
Thomas P. Simpson.
ATTORNEY.

UNITED STATES PATENT OFFICE.

BENJAMIN F. GILBERT AND GEORGE G. JAMES, OF EXETER, MISSOURI.

BUDDING-TOOL.

SPECIFICATION forming part of Letters Patent No. 613,031, dated October 25, 1898.

Application filed September 23, 1897. Serial No. 652,787. (No model.)

*To all whom it may concern:*

Be it known that we, BENJAMIN F. GILBERT and GEORGE G. JAMES, citizens of the United States, residing at Exeter, in the county of Barry and State of Missouri, have invented certain new and useful Improvements in Budding-Tools for Fruit and other Trees; and we do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a fruit-budder by which the bud may be taken out and inserted in the stock without bruising it or injuring its vitality.

Figure 1 of the drawings is a perspective view of the budder; Fig. 2, an assemblage of detail views, hereinafter described; Fig. 3, a detail view showing how the bud is inserted under the bark of the stock; Fig. 4, a view showing the bud after insertion; Fig. 5, a detail view of the inserter and the releaser; Fig. 6, a longitudinal and diametrical section of Fig. 5, and Fig. 7 a detail view of preferred form for cutting around the bud.

In the drawings, A represents the handle, with the ferrule $a$ and the cross-slots $a'$ $a^2$, while B is a rod bent at $b$ $b'$, secured at one end in a central hole of the handle, and carrying a tube C at the other end. In the end of tube C is arranged an inserter F, made, preferably, of a quill cut diagonally at one end to form a point to go under the bark of stock, and a releaser E, which is a short rod with a notch at the front end turned toward the point of inserter F, the said rod playing back and forth in the tubes C F.

$d'$ is a thumb-piece on rod E, arranged to project through a longitudinal slot of tube C, so as to control the releaser.

G is a knife secured to the handle by the cut ring $r$ and the screw S, and it is provided with the cutting edge $g$ and the two cross-cutters $g'$ $g^2$. The proper cut in the stock is made by the cutters $g'$ $g^2$, while the bud is excised by the cutting edge $g$, so as to leave about half an inch of the bark H below it. The bud is then placed within the inserter F. The point of the inserter is then placed at the cross-cut and the bark is lifted, after which the bud may be pushed down to the position intended to be occupied by it by moving the releaser. The inserter is now withdrawn and the operation is completed.

What we claim as new is—

1. A budder consisting of a handle A, a rod B bent at $b$ $b'$, a slotted tube C, a tube F diagonally cut at the front end, and a notched rod E having a thumb-piece $d'$, all combined, constructed and relatively arranged to operate in the manner and for the purpose specified.

2. A budder having a knife with the cutting edges $g$ $g'$ $g^2$ arranged as shown and described for the purposes set forth.

In testimony whereof we affix our signatures in presence of two witnesses.

BENJAMIN F. GILBERT.
GEORGE G. JAMES.

Witnesses:
FRANCIS M. JAMES,
WILLIAM N. BATES.